United States Patent [19]

Shibata et al.

[11] Patent Number: 5,095,437

[45] Date of Patent: Mar. 10, 1992

[54] ENGINE CONTROLLER WITH INTERRUPT PROCESSING

[75] Inventors: Akihito Shibata, Yokohama; Hidetoshi Sakurai, Wako, both of Japan

[73] Assignees: Matsushita Electric Industrial Co., Ltd., Osaka; Honda Giken Kogyo Kabushiki Kaisha, Tokyo, both of Japan

[21] Appl. No.: 407,751

[22] Filed: Sep. 15, 1989

[30] Foreign Application Priority Data

Sep. 21, 1988 [JP] Japan .................. 63-236951

[51] Int. Cl.$^5$ .......................... G06F 9/46; G05B 15/00
[52] U.S. Cl. .......................... 364/431.04; 364/431.05; 123/480; 123/417
[58] Field of Search ............... 364/431.05, 431.01, 364/431.03, 431.04, 431.11, 900, 152, 153; 123/416, 417, 480

[56] References Cited

U.S. PATENT DOCUMENTS

| | | | |
|---|---|---|---|
| 4,163,282 | 7/1979 | Yamada et al. | 364/431.06 |
| 4,282,573 | 8/1981 | Imai et al. | 364/431.11 |
| 4,337,513 | 6/1982 | Furuhashi | 364/431.11 |
| 4,355,360 | 10/1982 | Asano et al. | 364/431.11 |
| 4,558,417 | 12/1985 | Akiyama et al. | 364/431.05 |
| 4,740,915 | 4/1988 | Bonitz et al. | 364/900 |
| 4,831,536 | 5/1989 | Yakuwa et al. | 364/431.11 |
| 4,945,485 | 7/1990 | Fujimoto et al. | 364/431.04 |

FOREIGN PATENT DOCUMENTS 0146779  7/1985  European Pat. Off. .
57-038642  3/1982  Japan .
59-215930  12/1984  Japan .

*Primary Examiner*—Kevin J. Teska
*Assistant Examiner*—Michael Zanelli
*Attorney, Agent, or Firm*—Stevens, Davis, Miller & Mosher

[57] ABSTRACT

An engine controller includes a first calculation unit for calculating an amount of fuel injection and ignition timing by a first interrupt process in response to a TDC signal and calculating fuel injection start timing and ignition timing by a higher-order interrupt process having a higher priority than the first interrupt process, a second calculation unit for obtaining a value representing a proportion of the interrupt execution time contained in one interrupt period in accordance with the period of the first interrupt process and the interrupt execution time and comparing the value of the proporiton with a predetermined value, and an inhibition unit for omitting or inhibiting the execution of a next interrupt process by the first calculation means when the interrupt execution time contained in one interrupt period exceeds a predetermined value.

3 Claims, 6 Drawing Sheets

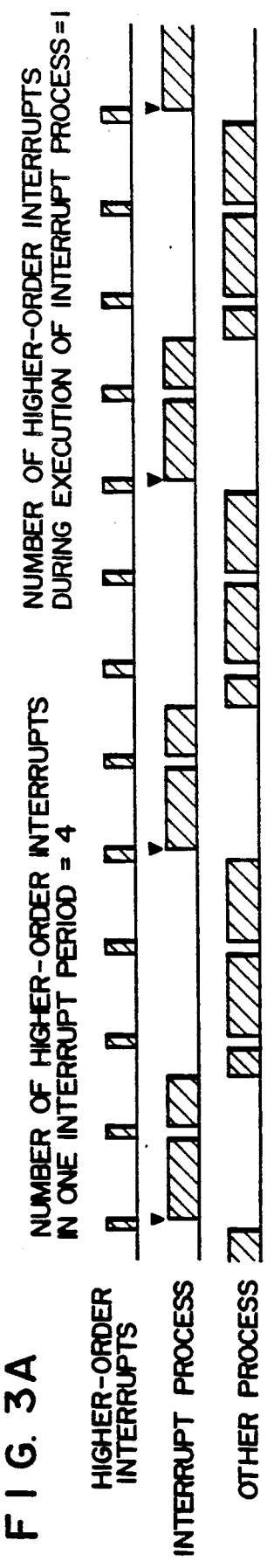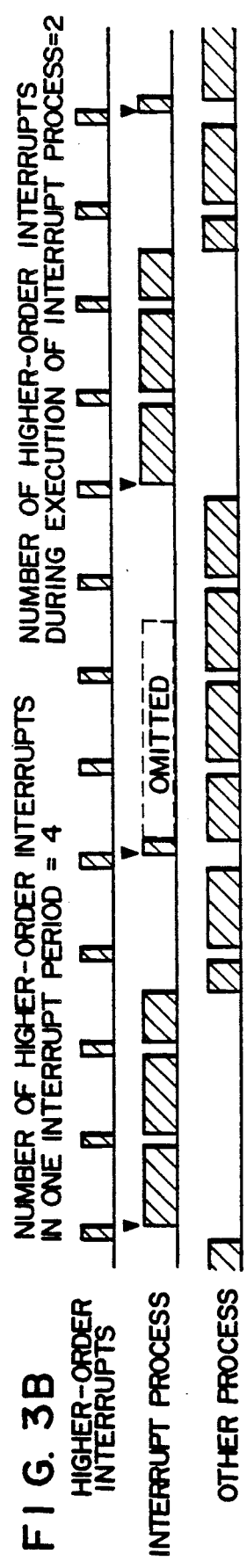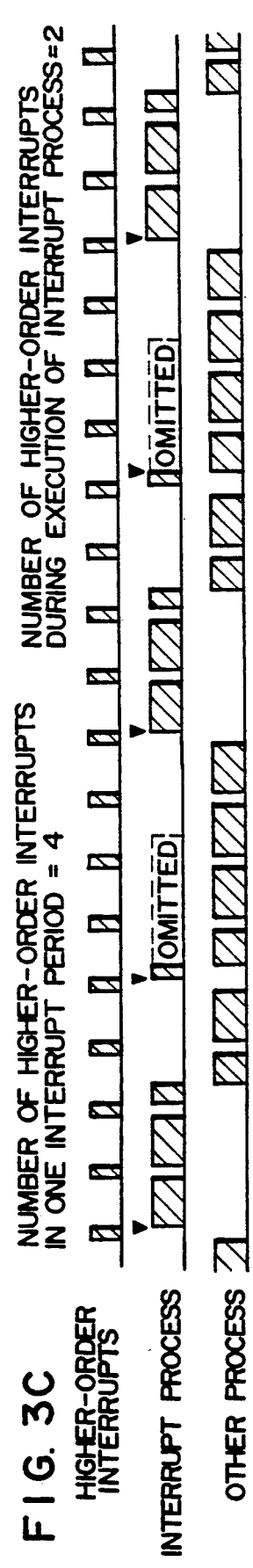

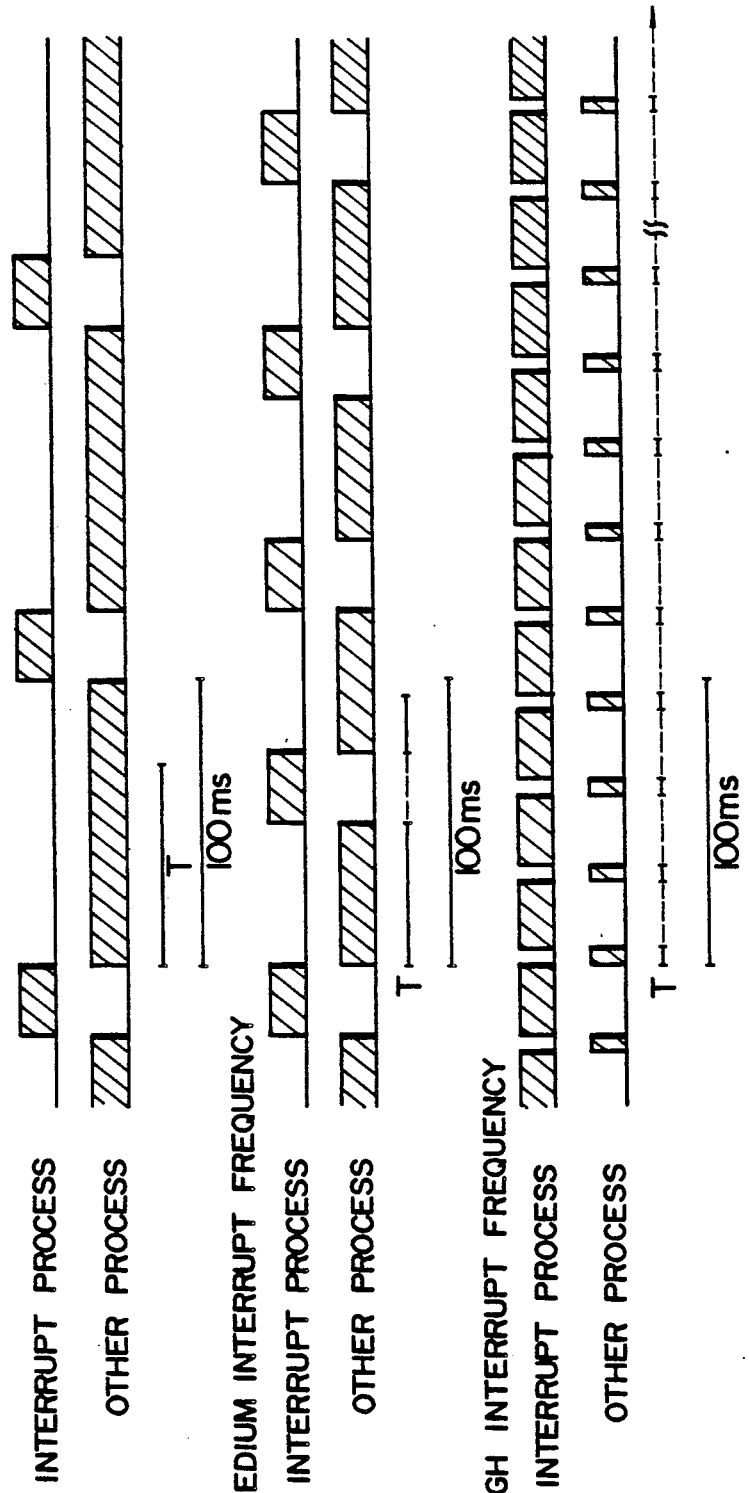

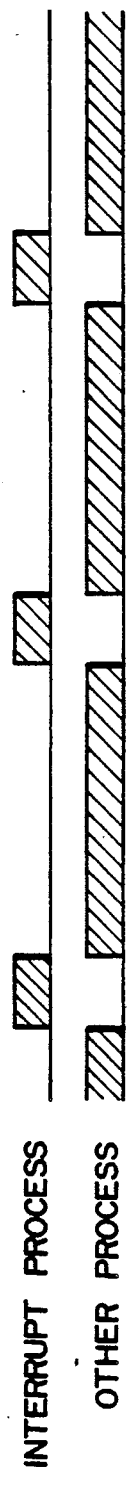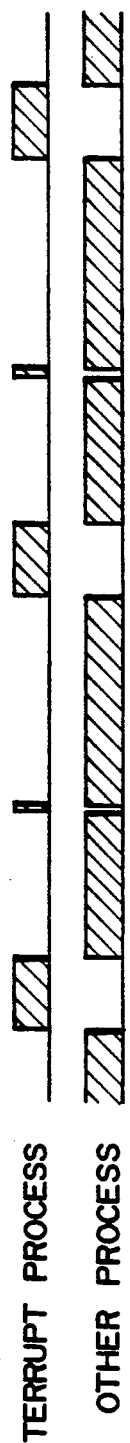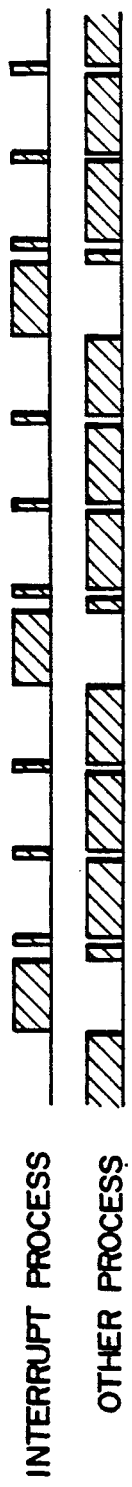
FIG. 5A LOW INTERRUPT FREQUENCY EXECUTION FREQUENCY 1/1
FIG. 5B MEDIUM INTERRUPT FREQUENCY EXECUTION FREQUENCY 1/2
FIG. 5C HIGH INTERRUPT FREQUENCY EXECUTION FREQUENCY 1/4

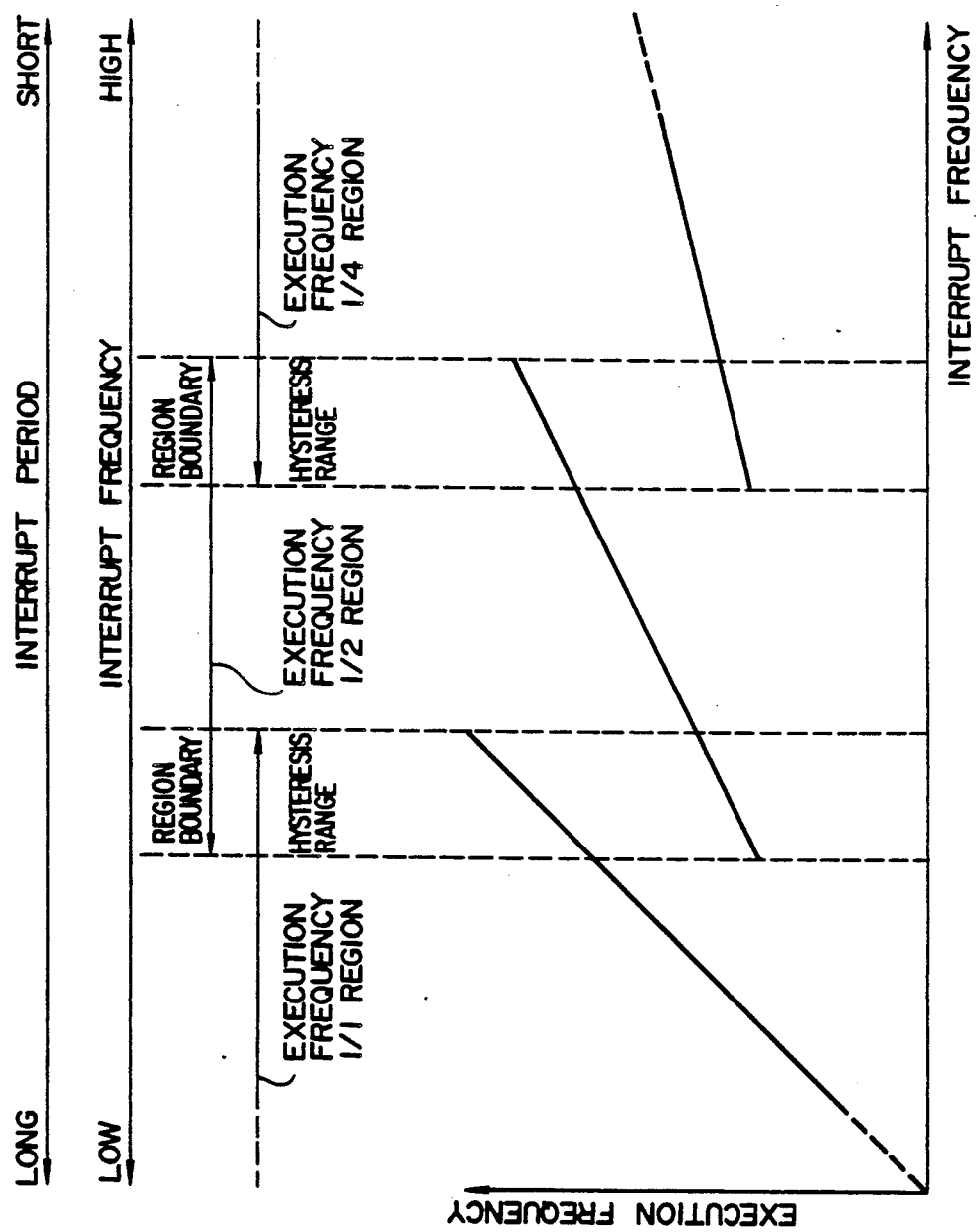

ENGINE CONTROLLER WITH INTERRUPT PROCESSING

BACKGROUND OF THE INVENTION

This invention relates to engine controllers for controlling an amount of fuel injection, ignition timing, etc. in accordance with the condition of the engine, and particularly to an engine controller using a microcomputer for executing interrupt processes.

The conventional engine controller employs a microcomputer to control the amount of fuel supply, ignition timing, ignition start timing, and so on. For example, a fuel injection controller for controlling the amount of fuel supply to the gasoline engine determines the amount of fuel supply to the engine by adding to the reference values of the rotational speed of the engine and the absolute pressure within the inlet pipe, the factors indicative of the operation conditions of the engine, for example, the constants and/or coefficients according to the rotational speed of the engine, the absolute pressure within the inlet pipe, the coolant temperature of the engine, the degree of opening of the throttle valve, the concentration of exhaust gas (concentration of oxygen) and so on, and/or by multiplying the reference values by those constants and/or the coefficients, and then controls the time in which the injector opens the valve, on the basis of the determined amount of fuel supply.

In the conventional fuel injection controller using a microcomputer, the constants and coefficients according to the coolant temperature of the engine and so on are determined by the background process, and the computation of the reference values of the amount of fuel supply, the addition of the constants and coefficients to the reference values and the multiplication therebetween are performed by the TDC interrupt. In addition, the setting of the fuel supply amount data determined by the above computation in the counter and the fuel injection timing are executed by a higher-order interrupt (for example, in a six-cylinder engine, the interrupt is synchronized with a signal generated at every 30 degrees of crank angle).

FIGS. 4A, 4B and 4C show the frequencies of the execution of interrupt processes and other processes (background process and so on) by the engine controller. That is, as the frequency of execution of interrupt processes increases, the time of execution of other processes decreases to an extent so as not to satisfy the condition of a predetermined "minimum execution time of other processes per unit time" (FIG. 4C).

Further, in FIG. 4A, T shows a length of the execution time of other processes which should be executed within 100 ms, for example. FIGS. 4A and 4B show respective cases where the execution time length T of the other processes is distributed within 100 ms. However, FIG. 4C shows a case where the execution time length T of the other processes is distributed exceeding 100 ms due to the high interrupt frequency.

Thus, in the conventional engine controller, some of the interrupt processes are omitted so as to meet both conditions of "the minimum execution time of interrupt processes per unit time" and "the minimum execution time of other processes per unit time". For example, the frequency of interrupt processes is calculated from the measured value of the interrupt period by using a timer or the like, and the frequency of the omission is increased with an increase in the interrupt frequency.

FIGS. 5A, 5B and 5C and FIG. 6 are diagrams showing that the frequency of the omission is increased with an increase in the interrupt frequency. In this example, the execution frequency is reduced step by step, such as by ½ and ¼, as the interrupt frequency is increased at every predetermined incremental value.

Moreover, it is known that as shown in FIG. 6, a hysteresis characteristic is provided to stabilize the the execution frequency in the regions where the relationship between the execution frequency and the interrupt frequency is changed.

The conventional engine controller, however, has a drawback in that, since the execution frequency is determined by the start period of interrupt processes, without considering whether the execution time of other processes is assured to exceed a specified value actually, it is necessary to change the setting of the regions, for example, where the frequency of start of interrupt processes are changed stepwise, when the contents of interrupt processes are changed to increase their execution time, but the execution time of other processes is not assured.

SUMMARY OF THE INVENTION

Accordingly, it is an object of the invention to provide an engine controller capable of automatically assuring the execution time of other processes even if the contents of interrupt processes are changed to increase the execution time.

According to this invention, there is provided an engine controller which is so arranged to calculate the proportion of the execution time of an interrupt process contained in one interrupt period, and to omit or inhibit the next interrupt process when the calculated proportion exceeds a predetermined value.

With the foregoing construction of this invention, even if the contents of interrupt processes are changed to increase their execution time, the execution time of processes other than the interrupt processes can be automatically maintained, because, when the proportion of the execution time of an interrupt process contained in one interrupt period exceeds a predetermined value, the next interrupt process is omitted or inhibited.

BRIEF DESCRIPTION OF THE DRAWINGS

FIGS. 3A, 3B and 3C are timing charts illustrating the operation of the engine controller of FIG. 1.

FIGS. 4A, 4B and 4C are timing charts showing a change of the execution frequency of interrupt processes and other processes, respectively, as the rotational speed of the engine changes.

FIGS. 5A, 5B and 5C and FIG. 6 are explanatory diagrams, respectively, showing that the frequency of omission of interrupt processes is increased with an increase in the interrupt frequency.

DESCRIPTION OF THE PREFERRED EMBODIMENT

Figure 1:
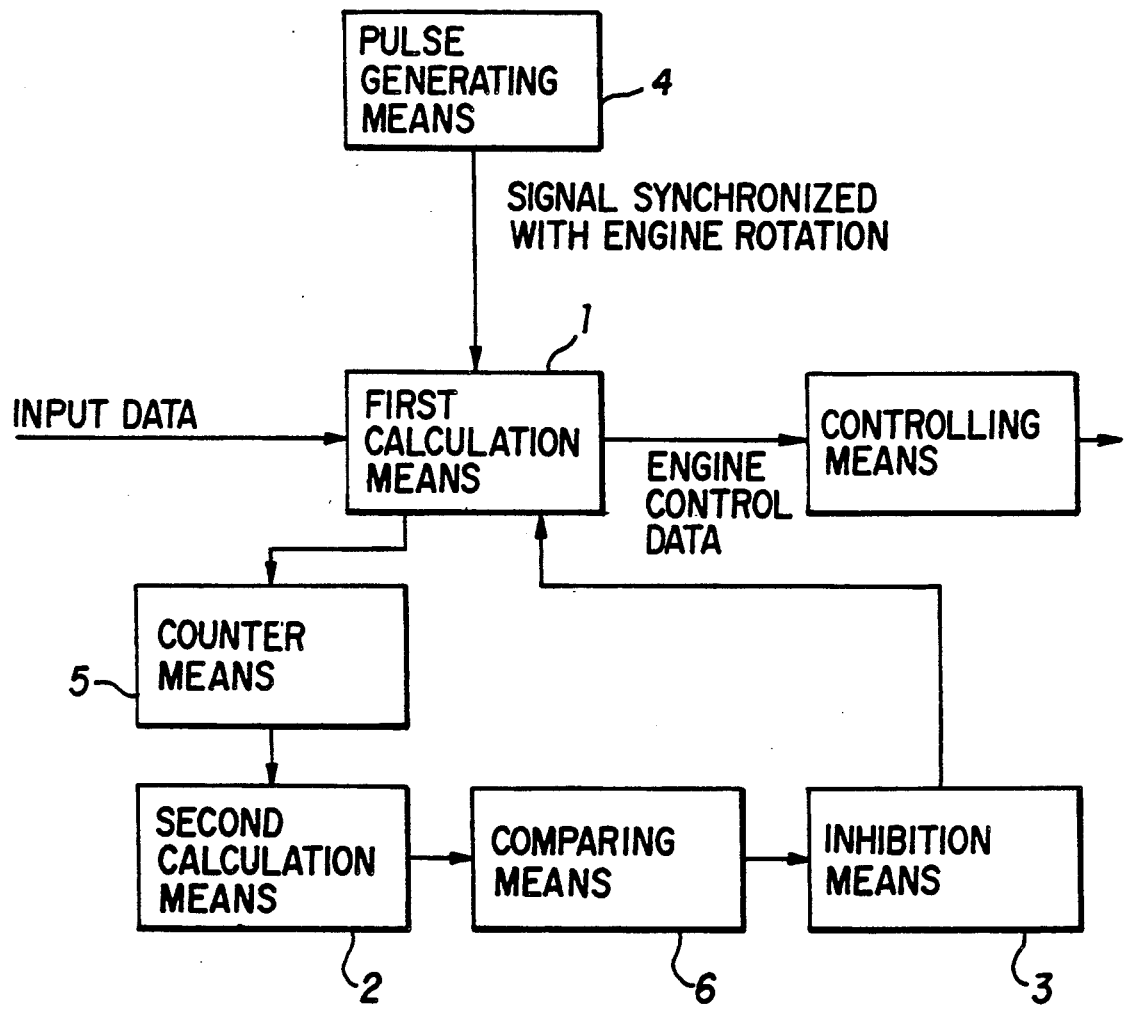
FIG. 1 is a functional block diagram showing an embodiment of an engine controller of this invention.

An embodiment of this invention will be described with reference to the accompanying drawings. FIG. 1 is a functional block diagram showing an embodiment of an engine controller of this invention, FIGS. 2A and 2B are flow charts for explaining the operation of the engine controller of FIG. 1, and FIGS. 3A, 3B and 3C are timing charts, respectively, for explaining the operation of the engine controller of FIG. 1.

Referring to FIG. 1, there is shown first calculation means 1 which executes interrupt processes in responsive to a TDC signal generated by a pulse generation means (for example, in a six-cylinder engine, the signal generated at every 120 degrees of crank angle) generated in synchronism with the rotation of the engine to calculate an amount of fuel injection, ignition timing and ignition current start timing. This first calculation means calculates a reference value of the amount of fuel injection according to the data of, for example, a rotational speed of the engine and an absolute pressure within the inlet pipe, and performs the addition of the constants and coefficients corresponding to the coolant temperature of the engine and the degree of opening of the throttle valve determined by the background processes to the reference value of the amount of fuel injection, and/or the multiplication therebetween. This first calculation means 1 also calculates the ignition timing, current start timing, etc. on the basis of the input data of the crank shaft angle and the like. Moreover, the first calculation means 1 executes the background process in a period in which the above interrupt process is not carried out. The background process calculates the constants and coefficients corresponding to, for example, a coolant temperature of the engine, an opening degree of the throttle valve and the exhaust concentration (oxygen concentration).

In FIG. 1, there is also shown second calculation means 2 for calculating the proportion of the execution time of an interrupt process contained in one interrupt period of the first calculation means 1. This second calculation means 2 comprises a period counter for counting the number of times of occurrence of higher-order interrupt processes occurring in the period from the start of an interrupt process to the start of the next interrupt process, an active counter for counting the number of times of occurrence of higher-order interrupt processes occurring while an interrupt process is executed, division means for making a division between a count of the period counter and a count of the active counter, and comparison means for comparing a result of division by the division means with a predetermined value. Shown at 3 is an inhibition means for omitting or inhibiting the next interrupt performed by the first calculation means 1 when the result of the calculation from the second calculation means 2 exceeds a certain value. These first and second calculation means 1 and 2 and the inhibition means 3 are constructed by a microcomputer, and this microcomputer executes the processing steps shown in FIGS. 2A and 2B.

Figure 2A:
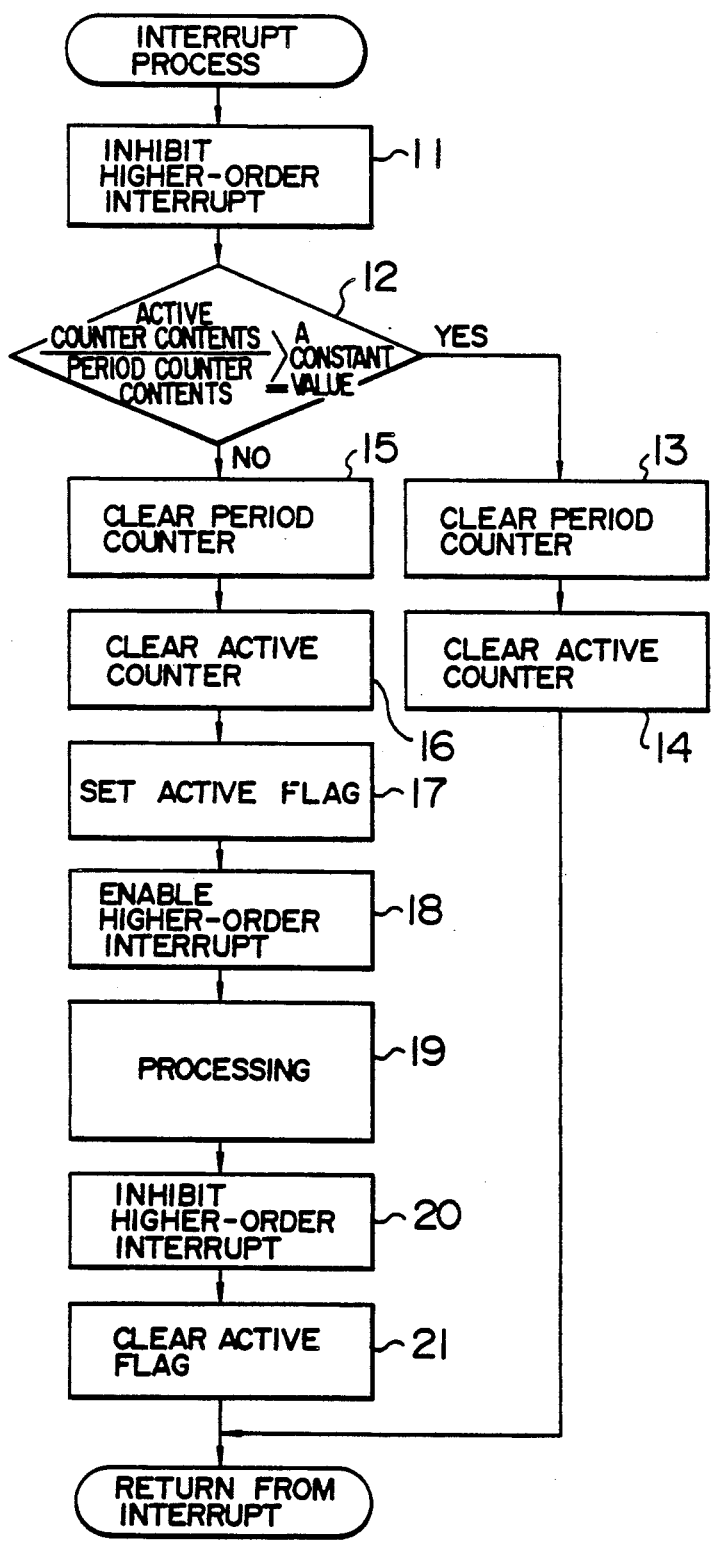
FIGS. 2A and 2B are flow charts, respectively, for explaining the operation of the engine controller of FIG. 1.
Figure 2B:
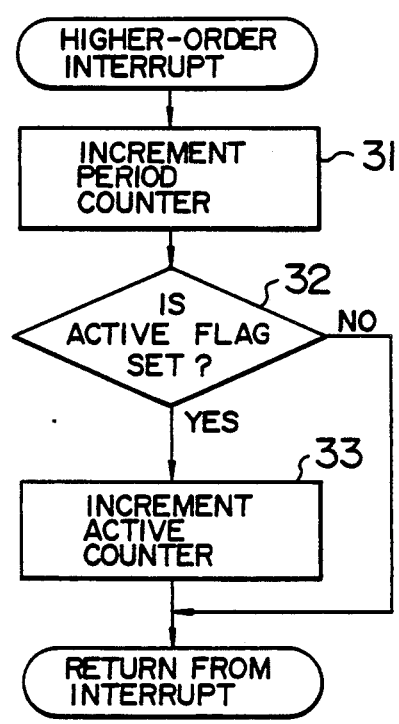

FIG. 2A shows an interrupt routine which is started by the signal synchronized with the rotation of the engine, such as the top data center position signal (TDC signal) of the engine to calculate the amount of fuel injection, the ignition timing, etc., and FIG. 2B shows a higher-order interrupt routine for the crank interrupt or the like which has a higher-priority of interrupt and a higher frequency of interrupt than the interrupt routine shown in FIG. 2A.

Referring to FIG. 2A, when an interrupt occurs, at step 11 a higher-order interrupt is inhibited. At step 12 the proportion R of the execution time of the interrupt contained in one interrupt period is determined from $$R = \frac{\text{the contents of the active counter}}{\text{the contents of the period counter}}$$

and a decision is made as to whether R is larger than a predetermine value $R_o$.

At step 12, when R is equal to or larger than $R_o$, the routine goes to step 13, where the period counter is cleared. At step 14, the active counter is cleared, and the processing returns from the interrupt process.

At step 12, when R is not larger than $R_o$, the routine proceeds to step 15, where the period counter is cleared. At step 16, the active counter is cleared. Then, at step 17 a flag is set to indicate that the interrupt process is now being executed. This flag is used, when a higher-order interrupt occurs while this interrupt process is being executed, to detect whether this interrupt process is being executed in the higher-order interrupt routine or not.

At step 18, the higher-order interrupt is allowed, and, at step 19, the amount of fuel injection ignition timing and so on are calculated. At step 20, the higher-order interrupt is inhibited, and, at step 21, the flag is cleared, and the processing returns from the interrupt.

Referring to FIG. 2B, when a higher-order interrupt occurs, at step 31, the period counter is incremented. At step 32, a decision is made as to whether the flag is set indicating that the interrupt process shown in FIG. 2A is now being executed.

When the flag is set, the routine proceeds to step 33, where the active counter is incremented. Then, the processing returns from the interrupt process. When the flag is not set, the processing returns directly from the interrupt process.

In other words, in the higher-order interrupt process routine shown in FIG. 2B and at step 12 of the interrupt process routine shown in FIG. 2A, the proportion R of the execution time of the interrupt process contained in one interrupt period is calculated by the second calculation means 2, and, when the proportion R exceeds $R_o$, the interrupt process is not made (inhibition means 3).

The operation of the above embodiment will be described with reference to FIGS. 3A, 3B and 3C.

FIGS. 3A, 3B and 3C show the relationship between the execution time of the interrupt process in the case when four higher-order interrupts occur during one interrupt period, and the execution time of other interrupt processes.

FIG. 3A shows the case in which one higher-order interrupt occurs during the execution of an interrupt process. The period counter of the second calculation means 2 counts the number of times (4 times) of occurrence of higher-order interrupts in one interrupt period, and the active counter of the second calculation means 2 counts the number of times (once) of occurrence of the higher-order interrupt during the execution of the interrupt process. Thus, in this case, the proportion R of the execution time of the interrupt process contained in one interrupt period is ¼.

FIG. 3B shows the case in which two higher-order interrupts occur during the execution of an interrupt process. In FIG. 3B, the number of items for the interrupt process is increased by the design change as compared with FIG. 3A. In this case, the period counter of the second calculation means 2 counts the number of times (4 times) of occurrence of higher-order interrupts in one interrupt period, and the active counter of the second calculation means 2 counts the number of times (2 times) of occurrence of higher-order interrupts during the execution of an interrupt process. Thus, the proportion R of the execution time of the interrupt process contained in one interrupt period is 2/4.

FIG. 3C shows the case in which the items for the interrupt process are the same as those in FIG. 3A, but the rotational speed of the engine is increased. In the case of FIG. 3C, the proportion R of the execution time is also 2/4, and thus omission of the interrupt process occurs.

In this embodiment, the predetermined value $R_o$ is set to $\frac{1}{2}$, and thus in the case of FIG. 3A, the result of comparing the proportion R of the execution time with $R_o$ in the comparison means of the second calculation means 2 is that R ($=\frac{1}{4}$) is smaller than $R_o$ ($=\frac{1}{2}$). Therefore, the next interrupt process is not inhibited by the inhibiting means 3. On the other hand, in the case of FIG. 3B, the result of comparing R with $R_o$ in the comparison means of the second calculation means 2 is that R ($=2/4$) is equal to or larger than $R_o$ ($=\frac{1}{2}$). Since the R is equal to the $R_o$, the next interrupt process is inhibited by the inhibition means 3 (in FIG. 3B, the processing of the portion surrounded by the broken line is inhibited).

Thus, according to this embodiment, when the proportion R of the execution time of the interrupt process contained in one interrupt period is equal to or larger than the predetermined value $R_o$, the next interrupt process execution is omitted, and thus, even if the contents of the interrupt process are changed to increase the execution time, the execution time of other processes can be automatically assured.

As described above, since the engine controller of this invention calculates the proportion of the execution time of the interrupt process contained in one interrupt period, and since, when the calculated proportion exceeds a predetermined value, it inhibits the next interrupt process, the execution time of processes other than the interrupt process can be automatically assured even if the contents of the interrupt process are changed to increase their execution time.

We claim:

1. A controller for an engine, comprising:
   a pulse generating means for generating synchronous pulse signals synchronously with the speed of rotation of the engine;
   first calculation means for calculating engine control data in accordance with a first interrupt process performed in synchronism with said synchronous pulse signals generated by said pulse generation means and for executing a higher-order interrupt process having a higher priority than said first interrupt process and a background process of a lower-order than said first interrupt process;
   counter means for counting a period of said first interrupt process and an execution time of said first interrupt process;
   second calculation means for determining a value representing a proportion of said execution time of said first interrupt process contained in one interrupt period;
   means for comparing said calculated value of said proportion with a predetermined value;
   interrupt inhibition means for inhibiting or omitting the execution of a next first interrupt process by said first calculation means when the value of the proportion of said interrupt execution time contained in said one interrupt period, which has been calculated by said second calculation means, exceeds said predetermined value; and
   controlling means for controlling said engine based on said calculated engine control data.

2. A controller for an engine, comprising:
   a pulse generating means for generating synchronous pulse signals synchronously with the speed of rotation of the engine;
   first calculation means for calculating engine control data in accordance with a first interrupt process performed in synchronism with said synchronous pulse signals generated by said pulse generation means and for executing a higher-order interrupt process having a higher priority than said first interrupt process and a background process of a lower-order than said first interrupt process;
   counter means for counting a period of said first interrupt process and an execution time of said first interrupt process;
   second calculation means for determining a value representing a proportion of said execution time of said first interrupt process contained in one interrupt period;
   means for comparing said calculated value of said proportion with a predetermined value;
   interrupt inhibition means for inhibiting or omitting the execution of a next first interrupt process by said first calculation means when the value of the proportion of said interrupt execution time contained in said one interrupt period, which has been calculated by said second calculation means, exceeds said predetermined value, wherein said counter means counts the period of said first interrupt process by counting a number of times of occurrence of said higher-order interrupt processes in the time interval from the start of said first interrupt process to the start of said next first interrupt process and counts the execution time of said first interrupt process contained in said one interrupt period by counting a number of times of occurrence of said higher-order interrupt processes occurring during the execution of said first interrupt process; and
   controlling means for controlling said engine based on said calculated engine control data.

3. A controller for an engine, comprising:
   a pulse generating means for generating synchronous pulse signals synchronously with the speed of rotation of the engine;
   first calculation means for calculating engine control data in accordance with a first interrupt process performed in synchronism with said synchronous pulse signals generated by said pulse generation means and for executing a higher-order interrupt process having a higher priority than said first interrupt process and a background process of a lower-order than said first interrupt process;
   counter means for counting a period of said first interrupt process and an execution time of said first interrupt process;
   second calculation means for determining a value representing a proportion of said execution time of said first interrupt process contained in one interrupt period;
   means for comparing said calculated value of the proportion with a predetermined value;
   interrupt inhibition means for inhibiting or omitting the execution of a next first interrupt process by said first calculation means when the value of the proportion of said interrupt execution time contained in said one interrupt period, which has been calculated by said second calculation means, exceeds said predetermined value, wherein said counter means comprises a first counter for counting said period of said first interrupt process by counting the number of times of occurrence of said higher-order interrupt processes in the time interval from the start of said first interrupt process to the start of said next first interrupt process, and a second counter for counting said execution time of said first interrupt process by counting the number of times of occurrence of said higher-order interrupt processes occurring during the execution of said first interrupt process, and said second calculation means comprising division means for obtaining said proportion of the execution time of said first interrupt process contained in one interrupt process period from the count values of said first and second counters, and said means for comparing compares a result of the division by said division means with a predetermined value; and controlling means for controlling said engine based on said calculated engine control data.

* * * * *